No. 855,463. PATENTED JUNE 4, 1907.
H. LEMP.
STEERING CHECK.
APPLICATION FILED SEPT. 10, 1906.
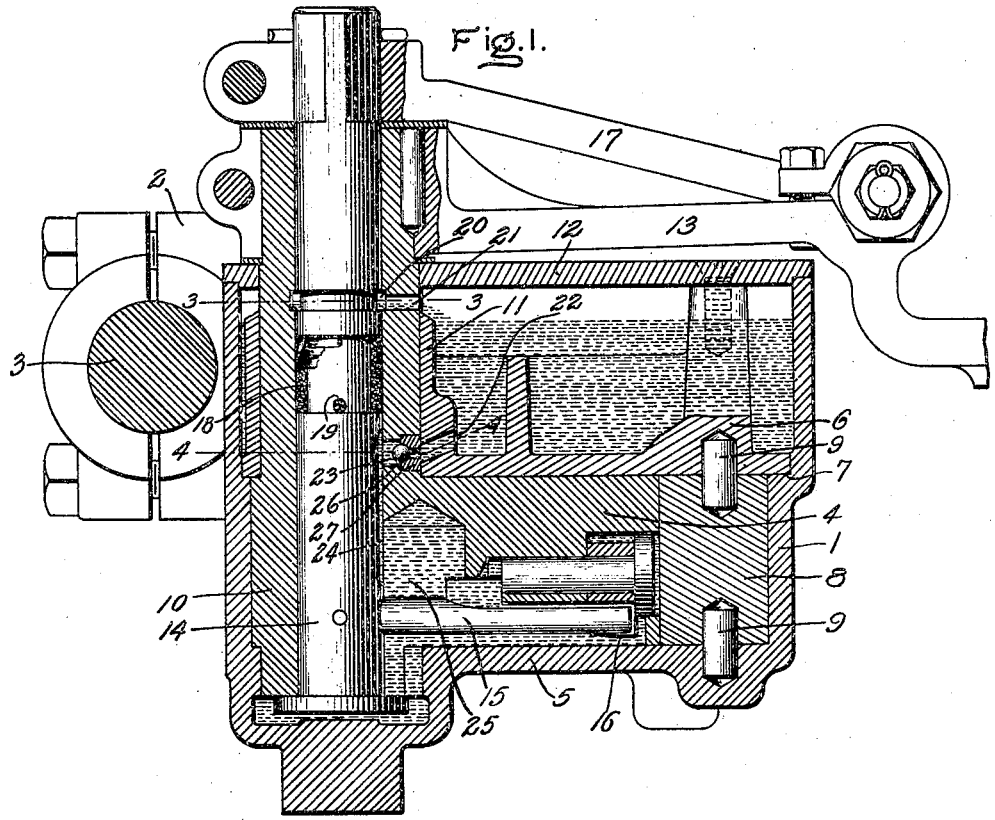
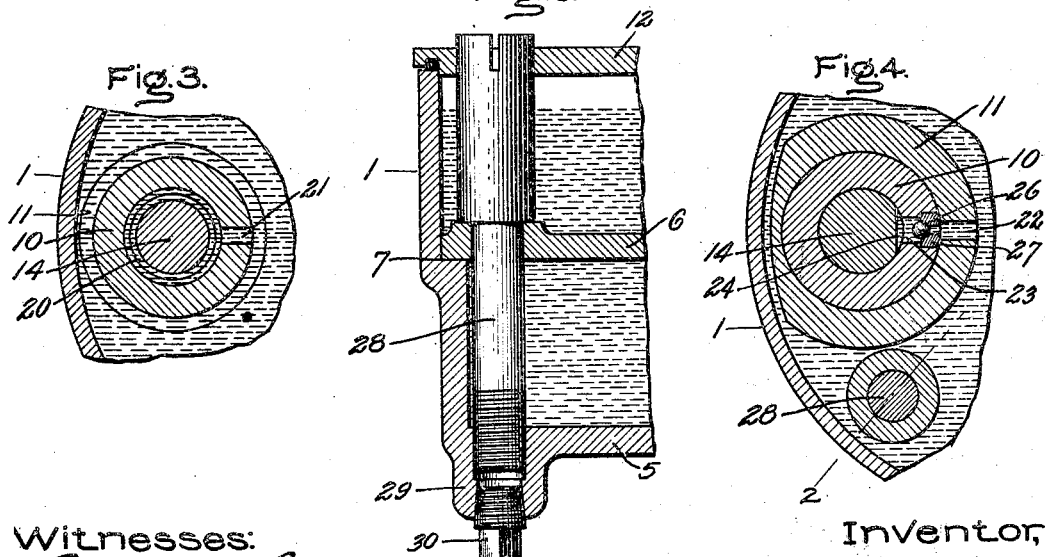
Witnesses:
George A. Thurston
Margaret E. Woolley
Inventor,
Hermann Lemp,
By Albert G. Davis
Att'y.

UNITED STATES PATENT OFFICE.

HERMANN LEMP, OF LYNN, MASSACHUSETTS, ASSIGNOR TO GENERAL ELECTRIC COMPANY, A CORPORATION OF NEW YORK.

STEERING-CHECK.

No. 855,463.  Specification of Letters Patent.  Patented June 4, 1907.

Application filed September 10, 1906. Serial No. 333,924.

*To all whom it may concern:*

Be it known that I, HERMANN LEMP, a citizen of the United States, residing at Lynn, county of Essex, State of Massachusetts, have invented certain new and useful Improvements in Steering-Checks, of which the following is a specification.

This invention relates to devices that are employed to prevent the transmission of wheel strains to the hand of the driver of an automobile.

It consists in certain changes in the construction of the steering-check disclosed in my Patent No. 725,457, wherein a pivoted piston is confined in a closed casing filled with liquid and is provided with valves to permit it to oscillate to and fro in said casing; said valves being controlled by a shaft journaled in the tubular hub of the piston.

In the accompanying drawings, Figure 1 is a vertical section of a steering check of this general type embodying my improvements; Fig. 2 is a section through one of the fastening bolts on the line 2, 2, Fig. 4; Fig. 3 is a cross-section on the line 3, 3, Fig. 1; and Fig. 4 is a cross-section on the line 4, 4, Fig. 1.

The casing 1 is provided with lugs 2 by means of which it is secured to some portion of the vehicle frame, such as the front axle 3. The piston 4 fits snugly between the flat bottom 5 of the casing and the under surface of the inner cover 6, which rests on the shoulder 7 in the casing. This shoulder is inset, so that the cover is smaller than the upper chamber of the casing. The customary crescent-shaped filling block 8 is secured in place by dowel pins 9 and presents a surface in contact with the end of the piston and concentric with the axis of the hub 10 of said piston. This hub extends up through a sleeve 11 integral with the inner cover and through a suitable hole in the outer cover 12. Secured to said hub is the lever 13 which is suitably connected with the steering check, so that the latter are locking in position until the piston is moved. A shaft 14 is journaled in the hub and carries at its lower end an arm 15 which actuates the rocker 16 for opening the valves in the piston. The shaft is rotated by the lever 17, from which motion is imparted to the lever 13 and piston 4 through spring buffers in the usual manner.

At a point just below the level of the liquid in the upper chamber above the inner cover, the shaft is reduced in diameter to receive a packing 18 which is preferably a soft fibrous cord wound around the shaft, with its ends secured by forcing them into holes 19 in said shaft. Above this packed portion there is an annular chamber 20 surrounding the shaft, preferably formed partly in the shaft and partly in the hub, as shown. This chamber registers with a radial hole 21 in the hub of the piston, which opens into the upper chamber of the casing above the level of the liquid therein: the sleeve 11 being cut away so as not to cover said hole.

A duct 22 is drilled through said sleeve just above the inner cover and registers with a radial passage 23 in the hub. The shaft, which otherwise has a snug fit in the hub, is slabbed off on this side at 24 from just above said hole down to a point within the cavity 25 in the piston. A ball valve 26 is located in the passage, seating against a bushing 27 or the like, and opening toward the shaft.

One of the bolts 28 which holds down the inner cover is long enough to protrude through the outer cover, as shown in Fig. 2, and is tapped into a tubular threaded boss 29 on the bottom of the casing. The end of the boss is closed from the outside by a pipe-plug 30.

The purpose and operation of these improvements is as follows: When the piston is moved rapidly, the pressure on the liquid in front of the piston forces said liquid into the cavity in the piston, from which it is not so freely sucked into the other chamber, owing to the fact that it cannot pass the valves fast enough. There is, therefore, a slight vacuum in the chamber behind the piston, and this tends to suck air down between the shaft and the sleeve. At the same time, the liquid forced into the cavity in the piston tends to escape into the upper chamber or even up through between the shaft and the hub. The tendency to enter the upper chamber is now prevented by the check valve 26, which, however, does not obstruct the flow of liquid from the upper chamber into the piston cavity when required. The suction of air down along the shaft, or the exit of liquid up past it, is prevented by the packing 18, and by the close fit given the shaft in the hub. In case, however, any liquid should get by the packing, it is returned to the upper chamber through the groove 20 and the hole 21. This construction is found to overcome all tendency of the device to act as a pump and empty the casing. Moreover, it insures keeping the checking chamber full of liquid by drawing it down past the ball valve.

The check can be cleaned without taking it apart. To effect this, the bolt 28 and the pipe-plug 30 are removed, allowing all the liquid to run out of the casing. The device can then be washed out with alcohol or gasolene, the pipe-plug replaced, fresh liquid filled in through the bolt hole in the upper cover, and the bolt re-inserted.

When the check is taken apart, the insetting of the shoulder 7 insures plenty of clearance for the inner cover after it has been lifted about quarter of an inch, permitting it to be removed very easily.

What I claim as new and desire to secure by Letters Patent of the United States, is,—

1. A steering check, comprising a casing, a piston movable therein and provided with a cavity, a hub on said piston containing a passage connecting the upper part of the casing with said cavity, and a check valve in said passage opening toward said cavity.

2. A steering check, comprising a casing, an inner cover having a sleeve containing a duct, a piston movable under said cover and having a cavity, a hub on said piston rotatable in said sleeve and having a passage registering with said duct and communicating with said cavity, and a check valve in said passage.

3. A steering check, comprising a casing, a piston movable therein and containing a cavity, a hub on said piston, a shaft journaled in said hub and entering said cavity, and packing surrounding said shaft above said cavity.

4. A steering check, comprising a casing, a piston movable therein and containing a cavity, a hub on said piston, a shaft fitting snugly in said hub and entering said cavity and having a reduced portion above said cavity, and packing surrounding said reduced portion of the shaft.

5. A steering check, comprising a casing having upper and lower chambers, a piston in said lower chamber, a hub on said piston extending into the upper chamber, a shaft fitting in said hub, an annular chamber surrounding said shaft, and a radial hole in said hub registering with said chamber and opening into the upper chamber of the casing.

6. In a steering check, the combination with a casing having a draining hole in its bottom, of an inner cover, a holding-bolt therefor passing through said inner cover and protruding through the upper cover.

7. In a steering check, the combination with a casing having a tubular boss on its bottom, of an inner cover, a holding-bolt therefor protruding through the upper cover with its lower end tapped into said boss, and a plug for closing said boss from the outside.

In witness whereof, I have hereunto set my hand this seventh day of September, 1906.

HERMANN LEMP.

Witnesses:
JOHN A. McMANUS, Jr.,
HENRY O. WESTENDARP.